United States Patent
Normile et al.

(10) Patent No.: US 8,175,260 B2
(45) Date of Patent: May 8, 2012

(54) ECHO CANCELLATION

(75) Inventors: James Oliver Normile, Los Altos, CA (US); Ryan R. Salsbury, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1369 days.

(21) Appl. No.: 11/745,568

(22) Filed: May 8, 2007

(65) Prior Publication Data
US 2007/0206779 A1 Sep. 6, 2007

Related U.S. Application Data

(63) Continuation of application No. 10/379,125, filed on Mar. 3, 2003, now Pat. No. 7,272,224.

(51) Int. Cl.
*H04M 9/08* (2006.01)
(52) U.S. Cl. .............. 379/406.08; 379/406.03
(58) Field of Classification Search ..... 379/387.01–395, 379/406.01–406.16, 3; 455/570, 63.1, 67.13; 370/286–292; 381/94.1–94.8
See application file for complete search history.

(56) References Cited

U.S. PATENT DOCUMENTS

| | | | |
|---|---|---|---|
| 5,568,558 A | 10/1996 | Ramm et al. | |
| 5,619,508 A | 4/1997 | Davis | |
| 5,646,990 A | 7/1997 | Li | |
| 5,796,819 A | 8/1998 | Romesburg | |
| 5,828,756 A | 10/1998 | Benesty et al. | |
| 5,937,060 A | 8/1999 | Oh | |
| 6,091,813 A | 7/2000 | Harley et al. | |
| 6,201,866 B1 | 3/2001 | Ariyama et al. | |
| 6,249,581 B1 | 6/2001 | Kok | |
| 6,381,272 B1 | 4/2002 | Ali | |
| 6,434,247 B1 | 8/2002 | Kates | |
| 6,442,275 B1 | 8/2002 | Diethorn | |
| 6,532,289 B1 * | 3/2003 | Magid | 379/406.01 |
| 6,574,336 B1 | 6/2003 | Kirla | |
| 6,597,787 B1 * | 7/2003 | Lindgren et al. | 379/406.05 |
| 6,622,030 B1 * | 9/2003 | Romesburg et al. | 455/570 |
| 6,744,884 B1 | 6/2004 | Bjarnason | |
| 7,272,224 B1 | 9/2007 | Normile et al. | |
| 2003/0108192 A1 * | 6/2003 | Tanrikulu et al. | 379/406.08 |

* cited by examiner

*Primary Examiner* — Md S Elahee
*Assistant Examiner* — Akelaw Teshale
(74) *Attorney, Agent, or Firm* — Schwegman, Lundberg & Woessner, P.A.

(57) ABSTRACT

A method, apparatus, system, and signal-bearing medium that in an embodiment determine a degree of correlation between a speaker output signal and a microphone input signal and modulate an adaptive gain of an acoustic echo canceller based on the degree of correlation.

17 Claims, 4 Drawing Sheets

ECHO CANCELLATION

CROSS-REFERENCE RELATED APPLICATIONS

This application is a continuation of U.S. application Ser. No. 10/379,125, filed on Mar. 3, 2003, now U.S. Pat. No. 7,272,224 the entire contents of which are incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to cancellation of echo in audio signals.

BACKGROUND

In the past, people met face-to-face when they wanted to communicate. But, in today's mobile, widely dispersed, and increasingly interconnected society, people often need to communicate with others who are far away. In order to facilitate this communication, teleconferencing and video conferencing are gaining in popularity. In teleconferencing, both parties have a conferencing system that may include a microphone and a speaker, and the parties are connected to each other via a network, so that they can converse. In video conferencing, the parties also have a camera and a video monitor, so the parties can converse while viewing still or moving video images of each other.

Teleconferencing and video conferencing systems suffer from the problem of acoustic echo, which is a delayed and distorted version of an original sound reflected back to its source. A traditional system typically includes a speaker/microphone pair on both ends (called the near-end and the far-end) of the connection. When near-end participants talk, their voices are picked up by the near-end microphone, transmitted to the far-end, and presented via the far-end speaker. The far-end microphone will also pick up this signal, directly or indirectly, and the far-end system will send it back to the near-end. This causes the near-end participants to hear a delayed and distorted version of their own speech, which is annoying.

Previous systems attempted to suppress echo by suppressing the signal from the microphone at one end when audio from the other end is present. Unfortunately, this leads to clipping of the voice signal and reduced intelligibility. More sophisticated systems employ active noise cancellation using a filter adapted to model the characteristics of the feedback paths between the speaker and the microphone. This suffers from the problems of high computational load of the filtering operation, difficulty in selecting an appropriate gain for the filter, and divergence of the filter when participants at the near and far ends are speaking simultaneously.

Although the problem of echo has been described in the context of teleconferencing and video conferencing, it can also occur when placing a telephone call with a speakerphone or whenever a speaker produces sound that enters a microphone.

SUMMARY

A method, apparatus, system, and signal-bearing medium are provided that in an embodiment determine a degree of correlation between a speaker output signal and a microphone input signal and modulate an adaptive gain of an acoustic echo canceller based on the degree of correlation.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The following detailed description is, therefore, not to be taken in a limiting sense, and the scope of the present invention is defined only by the appended claims.

In the following description, numerous specific details are set forth to provide a thorough understanding of the invention. It is understood, however, that the invention may be practiced without these specific details. In other instances, well-known circuits, structures, and techniques have not been shown in detail in order not to obscure the invention.

Figure 1:
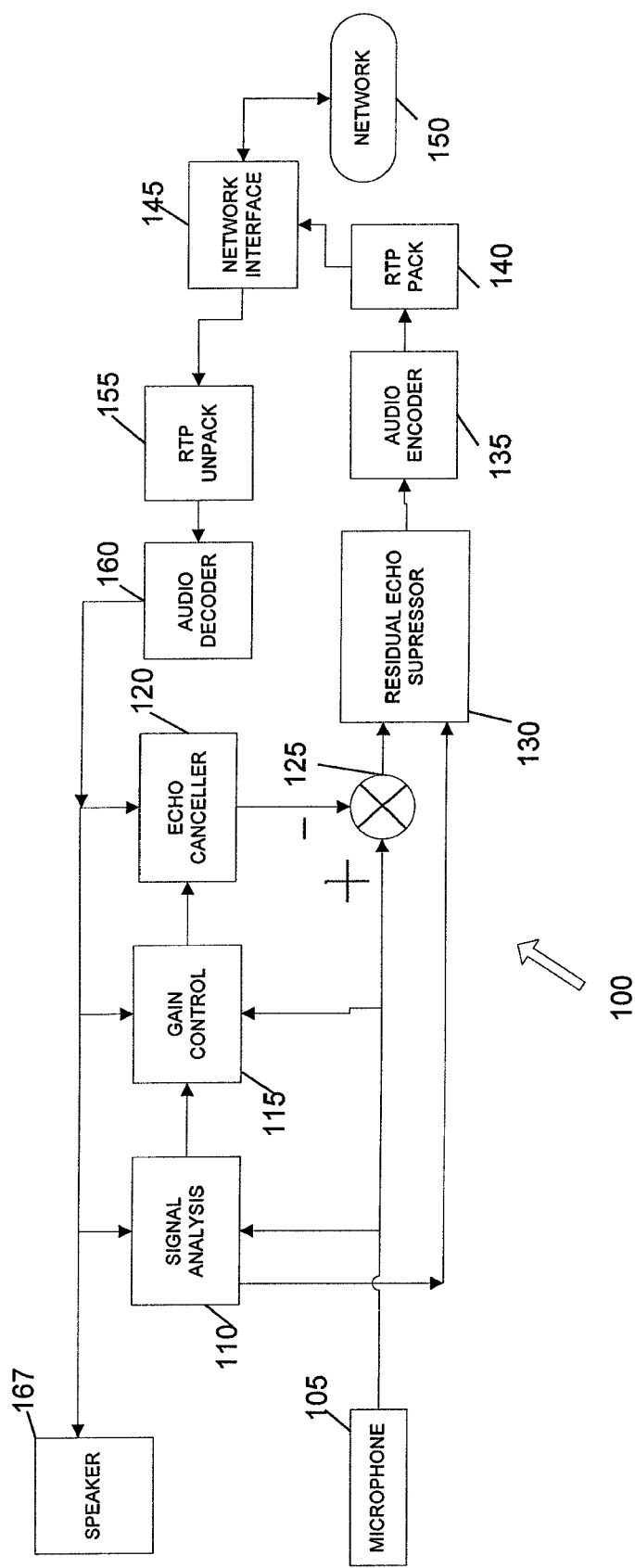
FIG. 1 depicts a block diagram of an example system for implementing an embodiment of the invention.

FIG. 1 depicts a block diagram of an example system 100 for implementing an embodiment of the invention. The system 100 includes a microphone 105, a signal analysis 110, a gain control 115, an echo canceller 120, a subtractor 125, a residual echo suppressor 130, an audio encoder 135, an RTP (Real-time Transport Protocol) pack 140, a network interface 145, a network 150, an RTP unpack 155, an audio decoder 160, and a speaker 167. In various embodiments, the elements in the system 100 may be implemented via hardware, software, or a combination of hardware and software.

The microphone 105 collects sound and presents audio input signals to the signal analysis 110, the gain control 115, and the subtractor 125. Although only one microphone 105 is shown, in other embodiments multiple microphones may be present.

The signal analysis 110 receives input signals from the microphone 105 and the audio decoder 160 and produces output signals to the gain control 115. The functions of the signal analysis 110 are further described below with reference to FIG. 2.

The gain control 115 receives input signals from the microphone 105, the signal analysis 110, and the audio decoder 160 and produces output signals to the echo canceller 120. The functions of the gain control 115 are further described below with reference to FIG. 2.

The echo canceller 120 receives input signals from the audio decoder 160 and the gain control 115 and produces output signals to the subtractor 125. The functions of the echo canceller 120 are further described below with reference to FIG. 2.

The subtractor 125 subtracts the output of the echo canceller 120 from the signal from the microphone 105 and outputs the result to the residual echo suppressor 130, as further described below with reference to FIG. 3.

The residual echo suppressor 130 receives input signals from the subtractor 125 and the signal analysis 110 and produces output signals to the audio encoder 135. The functions of the residual echo suppressor 130 are further described below with reference to FIG. 3.

The audio encoder 135 receives input signals from the residual echo suppressor 130 and produces output signals to the RTP pack 140.

The RTP pack 140 packs the data in the RTP format and presents it to the network interface 145. RTP is a standard for the transmission of audio and video data. Although the use of RTP is shown in FIG. 1, in other embodiments any appropriate standard or protocol for transmitting and receiving data may be used.

The network interface 145 sends data from the RTP pack 140 to the network 150 and receives data from the network 150 and sends it to the RTP unpack 155.

The RTP unpack 155 receives data from the network interface 145, unpacks the data, and sends it to the audio decoder 160.

The audio decoder 160 receives data from the RTP unpack 155 and sends audio signals to the signal analysis 110, the gain control 115, the echo canceller 120, and the speaker 167.

The network 150 may be any suitable network and may support any appropriate protocol suitable for communication. In an embodiment, the network 150 may support wireless communications. In another embodiment, the network 150 may support hard-wired communications, such as a telephone line or cable. In another embodiment, the network 150 may support the Ethernet IEEE (Institute of Electrical and Electronics Engineers) 802.3x specification. In another embodiment, the network 150 may be the Internet and may support IP (Internet Protocol). In another embodiment, the network 150 may be a local area network (LAN) or a wide area network (WAN). In another embodiment, the network 150 may be a hotspot service provider network. In another embodiment, the network 150 may be an intranet. In another embodiment, the network 150 may be a GPRS (General Packet Radio Service) network. In another embodiment, the network 150 may be any appropriate cellular data network or cell-based radio network technology. In another embodiment, the network 150 may be an IEEE 802.11B wireless network. In still another embodiment, the network 150 may be any suitable network or combination of networks. Although one network 150 is shown, in other embodiments any number of networks (of the same or different types) may be present.

The speaker 167 receives output signals from the audio decoder 160 and in response produces corresponding sound. The speaker 167 is situated so that its sound or a portion of its sound may be received, directly or indirectly, by the microphone 105. Although only one speaker 167 is shown, in other embodiments any number and type of speakers may be present.

Figure 2:
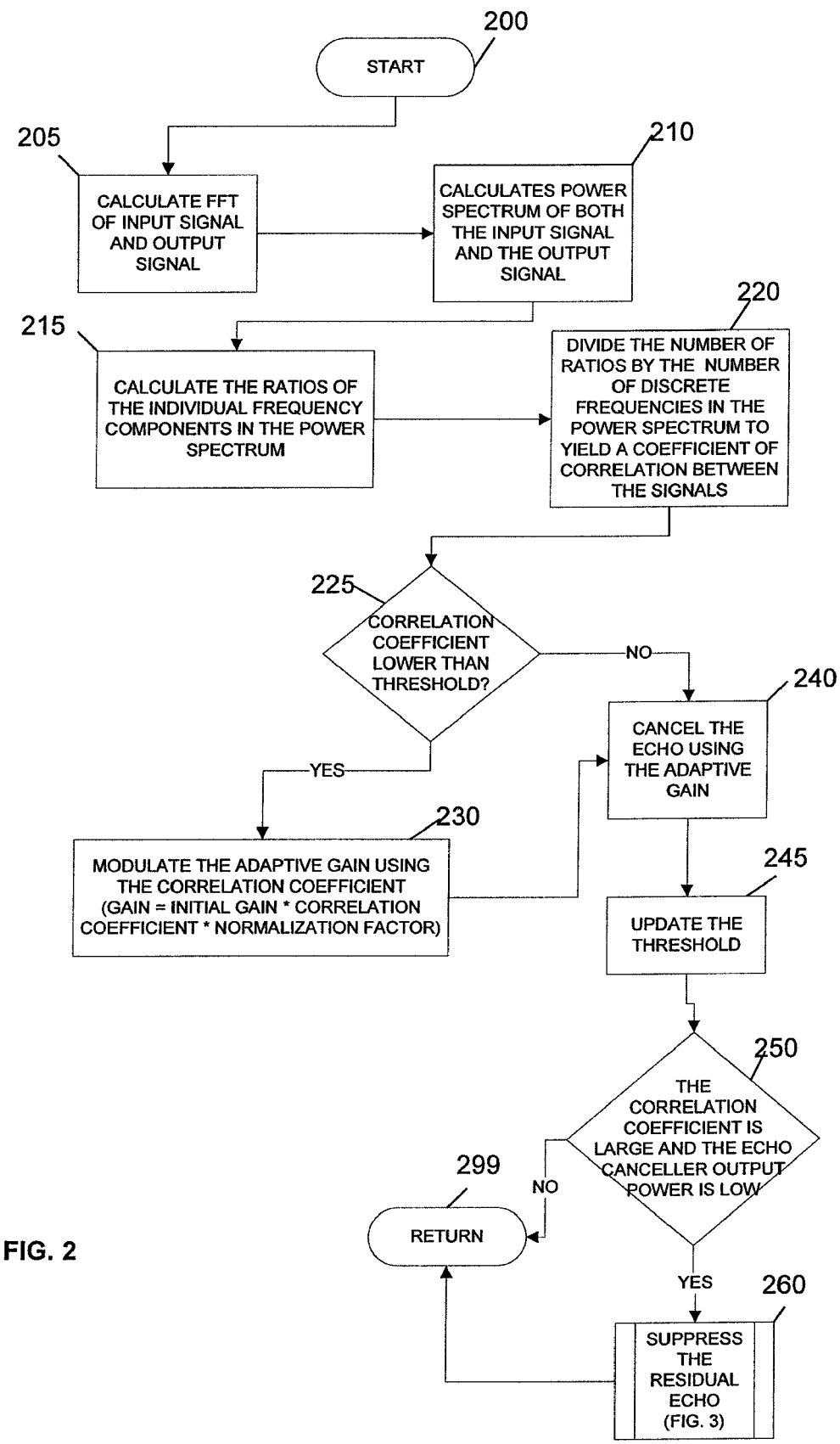
FIG. 2 depicts a flowchart of example processing, according to an embodiment of the invention.

FIG. 2 depicts a flowchart of example processing, according to an embodiment of the invention. Control begins at block 200. Control then continues to block 205 where the signal analysis 110 receives an input signal from the microphone 105 and calculates a FFT (Fast Fourier Transform) of the input signal and outputs the signal to the residual echo suppressor 130. Control then continues to block 210 where the signal analysis 110 calculates a power spectrum of both the input signal and the output signal. Control then continues to block 215 where the signal analysis 110 calculates the ratios of the individual frequency components of the power spectrum.

Control then continues to block 220 where the signal analysis 110 divides the number of ratios that exceed a threshold by the number of discrete frequencies in the power spectrum to yield a coefficient of correlation between the signals. Control then continues to block 225 where the signal analysis 110 determines whether the correlation coefficient is lower than a threshold. If the determination at block 225 is true, then control continues to block 230 where the gain control 115 modulates the adaptive gain using the correlation coefficient. In an embodiment, the gain is set to the initial gain multiplied by the correlation coefficient multiplied by a normalization factor.

Control then continues to block 240 where the echo canceller 120 cancels the echo using the adaptive gain. Control then continues to block 245 where the signal analysis 110 updates the threshold. Control then continues to block 250 where the residual echo suppressor 130 determines whether the correlation coefficient is large and the output power of the echo canceller 120 is low. If the determination at block 250 is true, then control continues to block 260 where the residual echo suppressor 130 suppresses the echo as further described below with reference to FIG. 3. Control then continues to block 299 where the function returns.

If the determination at block 250 is false, then control continues directly to block 299 where the function returns.

If the determination at block 225 is false, then control continues directly to block 240, as previously described above.

Figure 3:
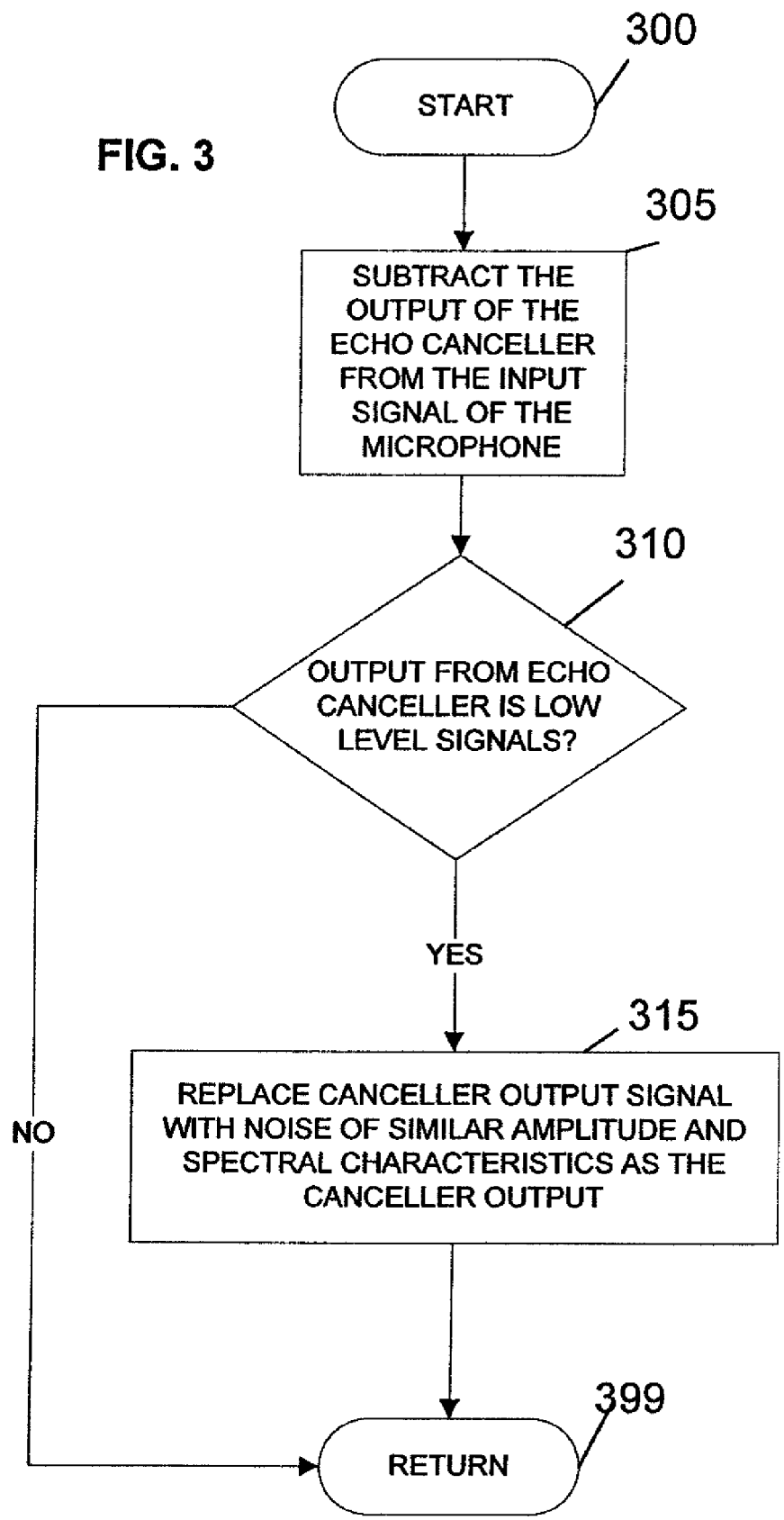
FIG. 3 depicts a flowchart of example processing, according to an embodiment of the invention.

FIG. 3 depicts a flowchart of example processing, according to an embodiment of the invention. Control begins at block 300. Control then continues to block 305 where the subtractor 125 subtracts the output of the echo canceller 120 from the input signal of the microphone 105 and sends the result to the residual echo suppressor 130. Control then continues to block 310 where the residual echo suppressor 130 determines whether an output from the echo canceller 120 is low level signals. If the determination at block 310 is true, then control continues to block 315 where the residual echo suppressor 130 replaces the output of the echo canceller 120 with an output signal with noise of similar amplitude and spectral characteristics as the output of the echo canceller 120. Control then continues to block 399 where the function returns.

If the determination at block 310 is false, then control continues directly to block 399 where the function returns.

Figure 4:
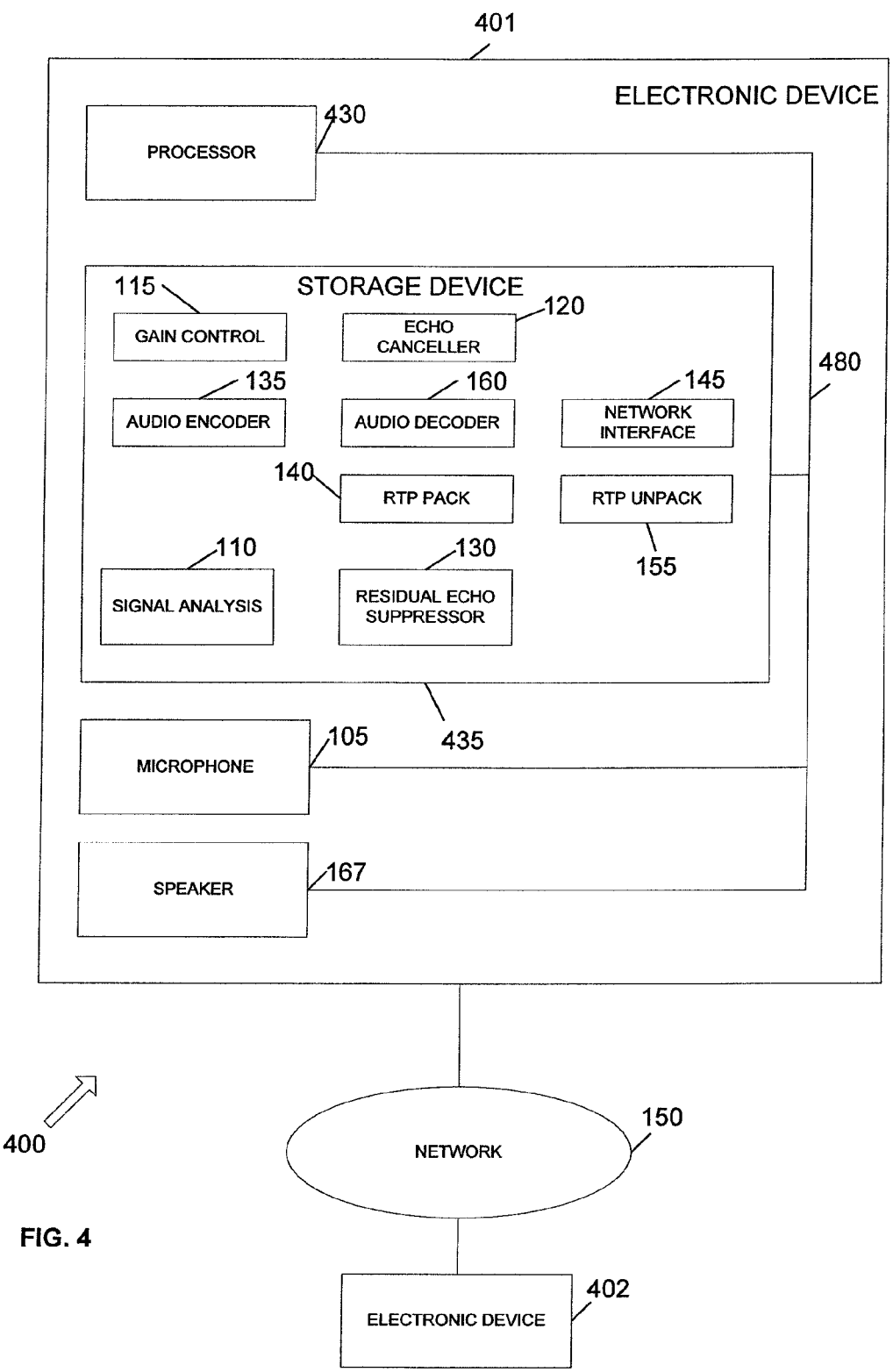
FIG. 4 depicts a block diagram of an example system for implementing an embodiment of the invention.

FIG. 4 depicts a block diagram of an example system 400 for implementing an embodiment of the invention. The system 400 includes an electronic device 401 connected to an electronic device 402 via a network 150. Although one electronic device 401, one electronic device 402, and one network 150 are shown, in other embodiments any number or combination of them are present.

The electronic device 401 includes a processor 430, a storage device 435, the microphone 105, and the speaker 167, all connected directly or indirectly via a bus 480.

The processor 430 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 430 executes instructions and includes that portion of the electronic device 401 that controls the operation of the entire electronic device. Although not depicted in FIG. 4, the processor 430 typically includes a control unit that organizes data and program storage in memory and transfers data and other information between the various parts of the electronic device 401. The processor 430 receives input data from the network 150 and the microphone 105, reads and stores code and data in the storage device 435, and presents data to the network 150 and/or the speaker 167.

Although the electronic device 401 is shown to contain only a single processor 430 and a single bus 480, the present invention applies equally to electronic devices that may have multiple processors and to electronic devices that may have multiple buses with some or all performing different functions in different ways.

The storage device 435 represents one or more mechanisms for storing data. For example, the storage device 435 may include read only memory (ROM), random access memory (RAM), magnetic disk storage media, optical storage media, flash memory devices, and/or other machine-readable media. In other embodiments, any appropriate type of storage device may be used. Although only one storage device 435 is shown, multiple storage devices and multiple types of storage devices may be present. Further, although the electronic device 401 is drawn to contain the storage device 435, it may be distributed across other electronic devices.

The storage device 435 includes the signal analysis 110, the gain control 115, the echo canceller 120, the residual echo suppressor 130, the audio encoder 135, the RTP pack 140, the network interface 145, the RTP unpack 155, and the audio decoder 160, all of which include instructions capable of being executed on the processor 430 to carry out the functions of the present invention, as previously described above with reference to FIGS. 1, 2, and 3. In another embodiment, some or all of the functions of the present invention are carried out via hardware. Of course, the storage device 435 may also contain additional software and data (not shown), which is not necessary to understanding the invention.

Although the signal analysis 110, the gain control 115, the echo canceller 120, the residual echo suppressor 130, the audio encoder 135, the RTP pack 140, the network interface 145, the RTP unpack 155, and the audio decoder 160 are shown to be within the storage device 435 in the electronic device 401, in another embodiment they may be distributed across other systems.

The bus 480 may represent one or more busses, e.g., PCI, ISA (Industry Standard Architecture), X-Bus, EISA (Extended Industry Standard Architecture), or any other appropriate bus and/or bridge (also called a bus controller).

The electronic device 401 may be implemented using any suitable hardware and/or software, such as a personal computer or other electronic computing device. Portable computers, laptop or notebook computers, PDAs (Personal Digital Assistants), pocket computers, appliances, telephones, teleconferencing systems, video conferencing systems, and mainframe computers are examples of other possible configurations of the electronic device 401. The hardware and software depicted in FIG. 4 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Further, the electronic device 401 may include any number and type of input devices for receiving input from a user, e.g., a keyboard, mouse or other pointing device, or a voice-recognition device.

The electronic device 402 may include components analogous to some or all of the components already described for the electronic device 401.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

1) information permanently stored on a non-rewriteable storage medium, e.g., a read-only memory device attached to or within an electronic device, such as a CD-ROM readable by a CD-ROM drive;
2) alterable information stored on a rewriteable storage medium, e.g., a hard disk drive or diskette; or
3) information conveyed to an electronic device by a communications medium, such as through a computer or a telephone network, including wireless communications.

Such signal-bearing media, when carrying machine-readable instructions that direct the functions of the present invention, represent embodiments of the present invention.

What is claimed is:

1. A method of processing an audio signal performed by an electronic device, the method comprising the acts of:
    modifying an audio input signal in a manner to reduce acoustic echo in the audio input signal, wherein the act of modifying is based on an adaptive gain that is adaptively modulated based on a degree of correlation between an audio output signal and the audio input signal, and further based on a comparison of the degree of correlation to a threshold; and
    adding noise to the modified audio input signal to suppress residual echo in the modified audio input signal; and
    wherein the act of modifying comprises applying the adaptive gain to the audio output signal to generate an echo canceller signal and subtracting the echo canceller signal from the audio input signal to generate the modified audio input signal.

2. The method of claim 1, wherein the noise has a same amplitude and similar spectral characteristics as the residual echo.

3. The method of claim 1 further comprising the acts of:
    encoding the modified audio input signal with the added noise; and
    transmitting the encoded audio signal across a network.

4. A machine-readable storage device for execution by one or more machines, the machine readable storage device comprising instructions that when implemented by one or more processors perform operations comprising:
    modifying an audio input signal to reduce acoustic echo in the audio input signal, wherein the audio input signal is modulated based on an adaptive gain that adapts based on a degree of correlation between the audio input signal and an audio output signal, and further based on a comparison of the degree of correlation to a threshold; and
    adding noise to the modified audio input signal said added noise functional to suppress residual echo in the modified audio input signal; and
    wherein the modifying comprises applying the adaptive gain to the audio output signal to generate an echo canceller signal and subtracting the echo canceller signal from the audio input signal.

5. The machine-readable storage device of claim 4, wherein the noise has a same amplitude and similar spectral characteristics as the residual echo.

6. The machine-readable storage device of claim 4, wherein the instructions, when implemented by one or more processors perform operations, further comprise encoding an audio input signal with said added noise.

7. A machine-readable storage device comprising instructions, that when executed by one or more machines perform operations, the instructions comprising:
- a first set of instructions that when executed by one or more machines, perform operations comprising computing a coefficient that indicates a degree of correlation between an audio input signal and an audio output signal;
- a second set of instructions that when executed by one or more machines, perform operations comprising modulating a gain of the audio input signal and the audio output signal based on the correlation coefficient computed by the first set of instructions, and further based on a comparison of the degree of correlation to a threshold;
- a third set of instructions that when executed by one or more machines, perform operations comprising applying the gain as modulated by the second set of instructions to the audio output signal to generate a modified audio output signal;
- a fourth set of instructions that when executed by one or more machines, perform operations comprising subtracting the modified audio output signal generated by the third set of instructions from the audio input signal to generate a modified audio input signal; and
- a fifth set of instructions that when executed by one or more machines, perform operations comprising adding noise to the modified audio input signal generated by the fourth set of instructions to suppress residual echo.

8. The machine-readable storage device of claim 7, wherein the noise added by the fifth set of instructions has approximately the same amplitude and similar spectral characteristics as the modified audio output signal.

9. The machine-readable storage device of claim 7 further comprising a sixth set of instructions executable to encode the modified audio input signal with the added noise generated by the fifth set of instructions.

10. An apparatus for suppressing echo, comprising:
- a signal analysis unit operable to compute a correlation coefficient that indicates a degree of correlation between an audio input signal and an audio output signal, the signal analysis unit configured to output the coefficient;
- a gain controller configured to receive the correlation coefficient from the signal analysis unit, the gain controller operable to modulate a gain of the audio input signal and the audio output signal based on the correlation coefficient to output an adaptive gain, in response to a comparison of the correlation coefficient to a threshold; and
- an echo canceller configured to receive adaptive gain from the gain controller, the echo canceller operable to apply the adaptive gain to the audio output signal and operable to output the audio output signal with the applied adaptive gain;
- a subtractor configured to receive output from the echo canceller, the subtractor operable to subtract the echo canceller output from the audio input signal and to output a result of the subtraction; and
- a residual echo suppressor configured to receive the output from the subtractor, the residual echo suppressor operable to add noise to the output from the subtractor to suppress residual echo and to output the subtractor output with the added noise.

11. The apparatus of claim 10, wherein the noise has a same amplitude and similar spectral characteristics as the residual echo.

12. The apparatus of claim 10 further comprising an audio decoder configured to receive an audio output signal, the audio decoder operable to decode the audio output signal and to output the decoded audio output signal to the gain controller, the signal analysis unit, and the echo canceller.

13. The apparatus of claim 10 further comprising a microphone.

14. The apparatus of claim 10 further comprising an audio encoder coupled with the residual echo suppressor, the audio encoder operable to encode output from the residual echo suppressor.

15. An electronic device comprising:
- a set of one or more audio signal processing units operable to modulate a gain of an audio input signal and an audio output signal based on a degree of correlation between the audio input signal and the audio output signal, and based on the relation of that degree of correlation to a reference value, and operable subtract the audio output signal as modified with the adaptive gain from the audio input signal to generate a modified audio input signal; and
- a residual echo suppressor unit coupled to receive the modified audio input signal from the set of audio signal processing units, the residual echo suppressor operable to add noise to the modified audio input signal to suppress residual echo.

16. The electronic device of claim 15, wherein the noise has a same amplitude and similar spectral characteristics as the audio output signal as modified with the adaptive gain.

17. The electronic device of claim 15 further comprising a second set of one or more audio processing units coupled to receive the modified audio input signal with the added noise from the residual echo suppressor, the second set of audio processing units operable to encode the modified audio input signal with noise from the residual echo suppressor and operable to prepare the encoded modified audio input signal for transmission across a network.

* * * * *